United States Patent
Hugues

(12) 
(10) Patent No.: US 11,009,115 B2
(45) Date of Patent: May 18, 2021

(54) PLUG FOR VENTING A TRANSMISSION

(71) Applicant: AKWEL, Champfromier (FR)

(72) Inventor: Julien Hugues, L'Isle sur la Sorgue (FR)

(73) Assignee: AKWEL, Champfromier (FR)

( * ) Notice: Subject to any disclaimer, the term of this patent is extended or adjusted under 35 U.S.C. 154(b) by 0 days.

(21) Appl. No.: 16/521,839

(22) Filed: Jul. 25, 2019

(65) Prior Publication Data

US 2020/0032892 A1 Jan. 30, 2020

(30) Foreign Application Priority Data

Jul. 25, 2018 (FR) ...................................... 18/70864

(51) Int. Cl.
*F16H 57/027* (2012.01)
*F16H 57/02* (2012.01)

(52) U.S. Cl.
CPC . *F16H 57/027* (2013.01); *F16H 2057/02043* (2013.01)

(58) Field of Classification Search
CPC ... F16H 57/027; H02K 2205/09; F16K 24/04; F16N 21/06; B65D 2205/00; B65D 81/263
See application file for complete search history.

(56) References Cited

U.S. PATENT DOCUMENTS

| 4,392,584 A | * | 7/1983 | Bauer | B65D 51/1611 |
| | | | | 220/373 |
| 4,561,558 A | * | 12/1985 | Richman | F16K 24/04 |
| | | | | 220/203.29 |
| 4,893,039 A | | 1/1990 | Isii | |
| 5,024,345 A | * | 6/1991 | Deweerdt | F16H 57/027 |
| | | | | 138/89 |
| 6,705,349 B2 | * | 3/2004 | Themudo | F01M 13/0405 |
| | | | | 138/89 |
| 2011/0173935 A1 | * | 7/2011 | Tesner | F16H 57/027 |
| | | | | 55/385.3 |

FOREIGN PATENT DOCUMENTS

| DE | 102014215127 B3 | * | 10/2015 | ........... F16H 57/027 |
| DE | 102017210717 A1 | * | 12/2018 | ........... F16H 57/027 |
| FR | 2 966 660 A1 | | 4/2012 | |
| WO | 96/16288 A1 | | 5/1996 | |

* cited by examiner

*Primary Examiner* — Daniel D Yabut
(74) *Attorney, Agent, or Firm* — Oliff PLC

(57) ABSTRACT

The venting plug is adapted to be mounted around an end of a hose intended to be connected at the other end to an opening provided in a case of an automotive component, said plug including a cylindrical peripheral sidewall around a main axis X closed by an end wall, a central rod member projecting axially from an inner surface of the end wall and being provided with a venting internal channel opening radially at least at the base of the rod member in the mounted position of the hose.

14 Claims, 6 Drawing Sheets

[Fig. 7]
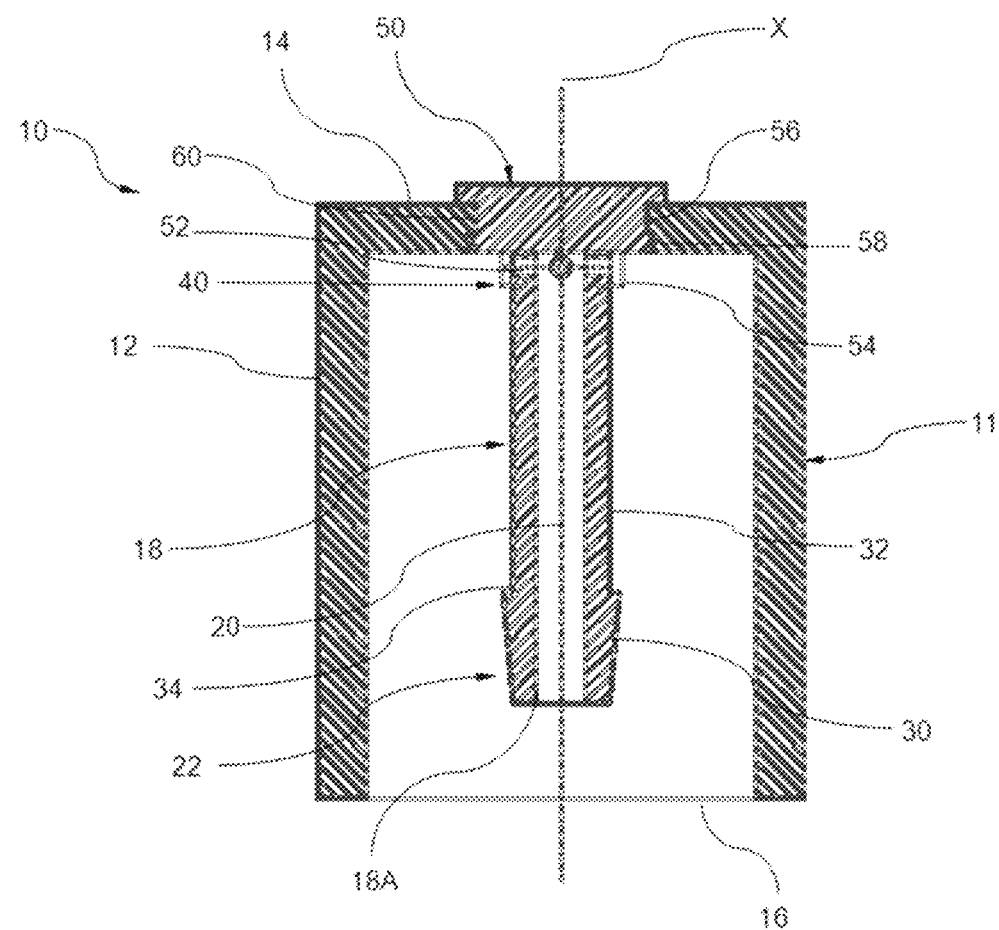

PLUG FOR VENTING A TRANSMISSION

TECHNICAL FIELD

The present invention concerns a plug for venting a transmission, such as a manual or automatic gearbox. Such a device is also commonly referred to by the term «breather».

In general, a multi-ratio mechanical transmission, whether manual, automatic or semi-automatic, uses a fluid disposed inside the transmission to accomplish various functions. For example, a manual mechanical transmission uses a fluid for the lubrication of the rotating or meshing parts. In turn, an automatic transmission uses a fluid to produce and transfer hydrodynamic energy in addition to ensure the lubrication of the rotating parts.

Such a transmission is generally subjected to temperature variations which result in a variation of the volume of the transmission liquid. This results in a pressure difference, called differential pressure, between the inside of the transmission and the outside which is subjected to the atmospheric pressure, also likely to vary.

In order to balance the internal and external pressures, some manufacturers have equipped gearboxes with a vent or with a breather. Thanks to the breather, during the operation of the gearbox, the fluid contained in the latter heats up and the vapors that are formed may escape to the outside via the breather.

Thus, when heat is generated within the transmission, the inner temperature of the air and of the hydraulic fluid therein as well as the inner pressure also rise and air is expelled towards the outside of the transmission via the breather. Conversely, when the inner temperature decreases relative to the external temperature, the differential pressure is reversed and air is admitted inside the transmission via the breather. In addition, in case of variation of the atmospheric pressure, the exchanges via the breather allow limiting the pressure difference between the inside and the outside of the casing.

The function of the breather further allows protecting the gearbox from the risk of penetration of impurities during the air circulation (polluting particles such as dust or mud, water splash) which may cause a premature wear of the gearbox.

PRIOR ART

In general, the breather is constituted by a simple venting hose which opens to the outside at a location which should be protected from the penetration of impurities.

In some cases, as described in particular in the document U.S. Pat. No. 5,024,345, the breather comprises, in addition to a flexible hose, a vent plug made of plastic in one-piece whose open end is adapted to receive an end of the flexible hose, the other end of the hose being connected to a vent hole in a case enclosing a component of the vehicle. The closed end of the vent plug comprises a central rod element projecting axially from the latter, with a plurality of radial ribs linking the rod element to the cylindrical sidewall of the plug. These radial ribs are L-shaped and define, together with the rod, a concentric space adapted to receive an end portion of the hose in a flexible manner.

When inserting the hose into the plug, the inner and outer surfaces of the hose cooperate with the structure of the plug to define inner and outer axial flow passages communicating with a cross flow passage enabling the ventilation of the case with the atmosphere.

The drawback of the plug described in the prior art lies in that its configuration is unsuitable for retaining hoses made of a rigid material. Indeed, the plug imparts an external tightening on the hose by pinching the latter.

Consequently, in order to ensure and effective pinching of the hose and thus enable a reliable connection of the hose and of the plug, the hose is preferably made of a deformable and flexible material. For example, the hose is preferably made of rubber.

Yet, the manufacturing cost of hoses made of a deformable material such as rubber is generally higher than the manufacturing cost of hoses made of a rigid material.

It may therefore be desired to equip the breather with hoses made of a rigid material in order to reduce the overall manufacturing cost of the breather comprising the plug and the hose, yet without making the manufacture of the plug itself more complex.

SUMMARY OF THE INVENTION

To this end, an object of the invention is a venting plug adapted to be mounted around an end of a hose, in particular intended to be connected at the other end to an opening provided in an automotive component, said plug comprising an external body provided with a peripheral sidewall with a main axis X closed by an end wall, a central rod member projecting axially from an inner surface of the end wall and being provided with a venting internal channel opening transversely at least at the base of the rod member in the mounted position of the hose, wherein the rod member is provided at its free end with a retaining element around which the hose is fitted, the retaining element being configured to retain the fitted hose tightened around the rod member characterized in that the fitting stroke of the hose along the rod member is limited by at least one rib protruding from the inner surface of the end wall forming an end-of-stroke stop and in that the rib extends longitudinally radially from the rod member up to the internal cylindrical wall.

Thanks to the invention, the plug is adapted to retain any type of flexible or rigid hoses. Indeed, with the rod member provided with the retaining element, the retention of the hose is achieved by means of a tightening from the inside and no longer by material pinching as is the case in the prior art. Thus, it is possible to connect a rigid hose on the rod member.

The plug according to the invention may further include one or more of the following features.

In a preferred embodiment of the invention, the retaining element comprises a trunconical fitting flaring from the free end of the rod member and extending in a cylindrical section forming a shoulder beneath the fitting.

In a preferred embodiment of the invention, the fitting stroke of the hose along the rod member is limited by at least one rib forming a stop protruding from the inner surface of the end wall.

In a preferred embodiment of the invention, the rib extends longitudinally radially from the rod member up to the internal cylindrical wall.

In another preferred embodiment, the plug is made integrally in one-piece and obtained by molding.

In another preferred embodiment, the plug comprises at least two parts assembled together, the first part comprising the external body and the second part comprising the rod member.

In another preferred embodiment, the rod member has at its base at least one venting orifice and an end-of-stroke stop protrusion of the hose.

In another preferred embodiment, the end wall of the external body is provided with an opening for receiving the rod member by forced snap-fitting.

In another preferred embodiment, the retaining element is provided with at least two axial slots extending from the free end of the rod member in order to delimit at least two axial lobes adapted to elastically get close to each other inwardly during the fitting of the hose.

In another preferred embodiment, the rod member is provided with a plurality of axial slots in order to delimit the same number of axial lobes.

In another preferred embodiment, the axial slots extend from the free end of the rod member up to the inner surface of the end wall of the plug and extend beyond the limit of the stroke of the hose to form passages for air flow from the venting central channel between an end of the hose and the end wall.

In another embodiment, the axial lobes are separated from each other and are formed from the inner surface of the end wall.

In another preferred embodiment, the axial lobes are evenly distributed around the axis and delimit together the venting channel.

In another preferred embodiment, each lobe has an inner surface with a general shape consisting of an inner surface of a wall section of a hollow cylinder.

In another preferred embodiment, the axial lobes are shaped so as to get close to each other inwardly of the rod member in order to compose at the end thereof a substantially closed circular contour delimiting an inlet of the venting channel.

In another preferred embodiment, the rod member fully extends inside the internal volume delimited by the end wall and the peripheral wall of the plug.

BRIEF DESCRIPTION OF THE DRAWINGS

Other features and advantages of the invention will appear in light of the following description, made with reference to the appended drawings in which:

FIG. 7 is a sectional view of a plug according to a second embodiment of the invention.

DESCRIPTION OF THE EMBODIMENTS

Figure 1:
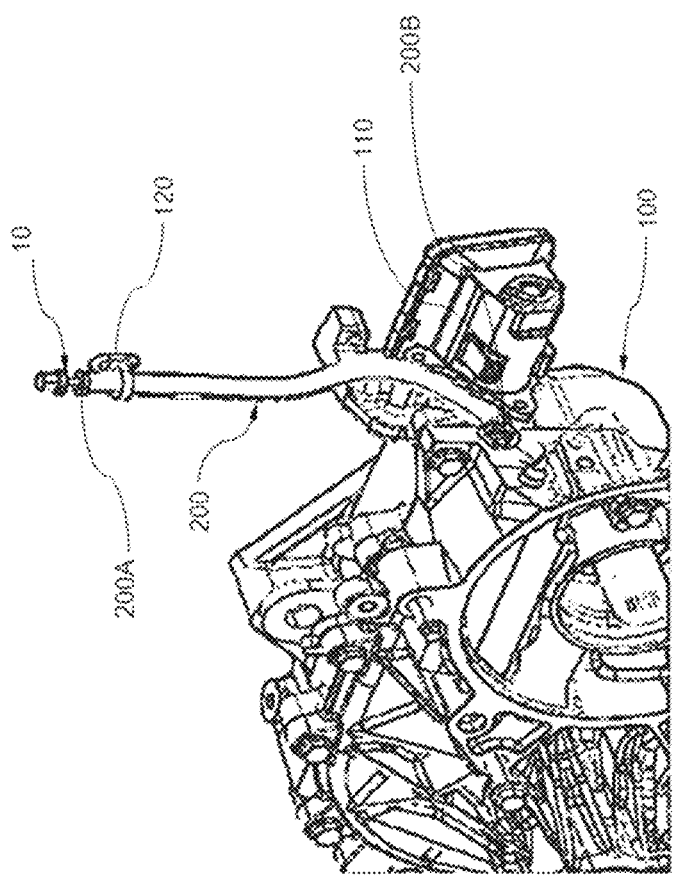
FIG. 1 is a partial perspective view of a transmission casing of a motor vehicle to which a venting plug according to a preferred embodiment of the invention is remotely connected by means of a hose.

In FIG. 1, there is represented a partial view of a transmission casing 100. For example, the casing 100 comprises an air purging connector 110 adjacent to a venting opening (not represented) formed in the casing 100. For example, the connector 110 is provided with a conduit sealing ring receiving a lower end 200B of a hollow conduit 200 or hose. The free upper end 200A of the hose 200 is for example supported on a frame element of the vehicle by a fastening staple or a suitable fastening clip 120.

A venting plug according to the invention is adapted to be received on the upper end 200A of the hose 200 as shown in FIG. 1. Subsequently, This plug is referred to by the general reference numeral 10. This plug 10 is adapted to be mounted around the end 200A of the hose 200. The other end 200B of the hose 200 is intended to be connected, as already indicated hereinabove, for example to an opening provided in a case of an automotive component (not represented) such as the transmission casing 100 represented in FIG. 1.

First and second embodiments of the plug 10 according to the invention will now be described in more detail with reference to FIGS. 1 to 7.

In accordance with the invention, the plug 10 comprises an external body 11 provided with a peripheral lateral wall 12 with a main axis X and closed by an end wall 14. Preferably, the plug 10 has at its other end, an opening 16 for the passage of the hose 200 delimited by a flange formed circumferentially by the cylindrical wall 12. In the example illustrated in the figures, the plug 10 has a cylindrical general shape. Of course, other shapes may be suitable for making the peripheral wall.

Furthermore, the plug 10 comprises a central rod member 18 projecting axially from the inner surface 14*l* of the end wall 14. In order to enable the venting of the gearbox 100 when the plug 10 is mounted on the hose 200, the rod member 18 is provided with a venting internal channel 20 opening radially at least at the base of the rod member 18 in the mounted position of the hose 200 in order to enable an air circulation. Preferably, the venting channel 20 has a substantially circular cross-section.

The air flow passages 40 at the base of the rod member 18 enable the circulation of air from the venting channel 20 to the outside and vice versa. Preferably, the structure of the inner surface of the plug 10 cooperates with the hose 200 in the mounted state around the rod member 18 to define transverse flow passages 40, and in this specific case, radial, at the level of the base of the rod member 18 enabling the ventilation of the case 100 with the atmosphere.

Figure 2:
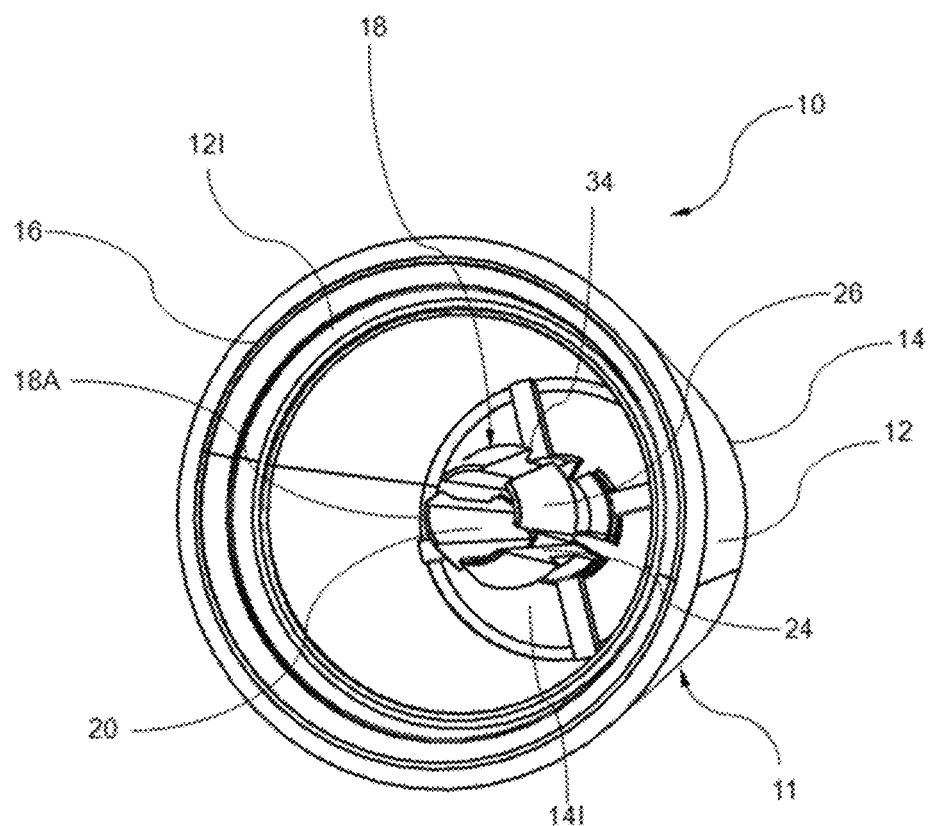
FIG. 2 is a perspective view of the plug of FIG. 1.

Preferably and as shown in particular in FIG. 2, the rod member 18 fully extends inside the internal volume delimited by the end wall 14 and the peripheral wall 12 of the plug 10. Thus, the top or free end 18A of the rod member 18 extends backset from the passage opening of the plug 10.

Furthermore, more particularly, the rod member 18 is provided at its free end 18A with a retaining element 22 around which the hose 200 is fitted. In accordance with the invention, the retaining element 22 is configured to retain the fitted hose 100 tightened around the rod member 18.

Figure 3:
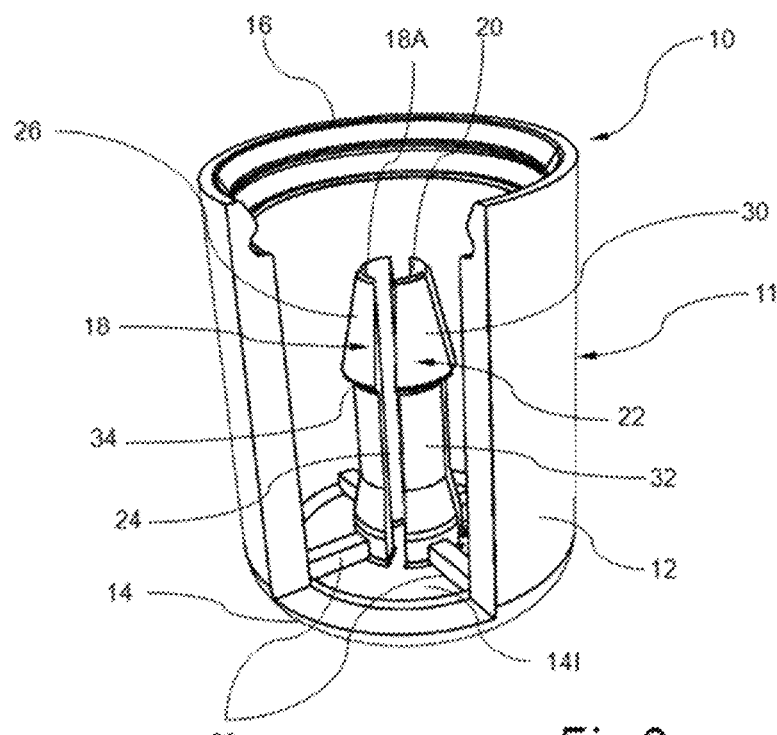
FIG. 3 illustrates a cutaway view of the plug of FIG. 2.

Preferably, the retaining element 22 comprises a trunconical fitting 30 flaring from the free end 18A of the rod member 18 and extending in a cylindrical section 32 forming a shoulder 34 beneath the fitting 30. Such a connection element 22 is also known as fir-tree corrugated fitting. Thus, as shown in FIG. 3, the fitting 30 is a male fitting with a fir-tree or arrow general shape. Of course, although not illustrated in the figures, the fitting 30 may alternatively include a plurality of circumferential barbs to form another type of fir-tree corrugated configuration.

Moreover, preferably, the fitting stroke of the hose 200 along the rod member 18 is limited by at least one rib 28 forming a stop and formed in projection on the inner surface 14*l* of the end wall 14.

Figure 4:
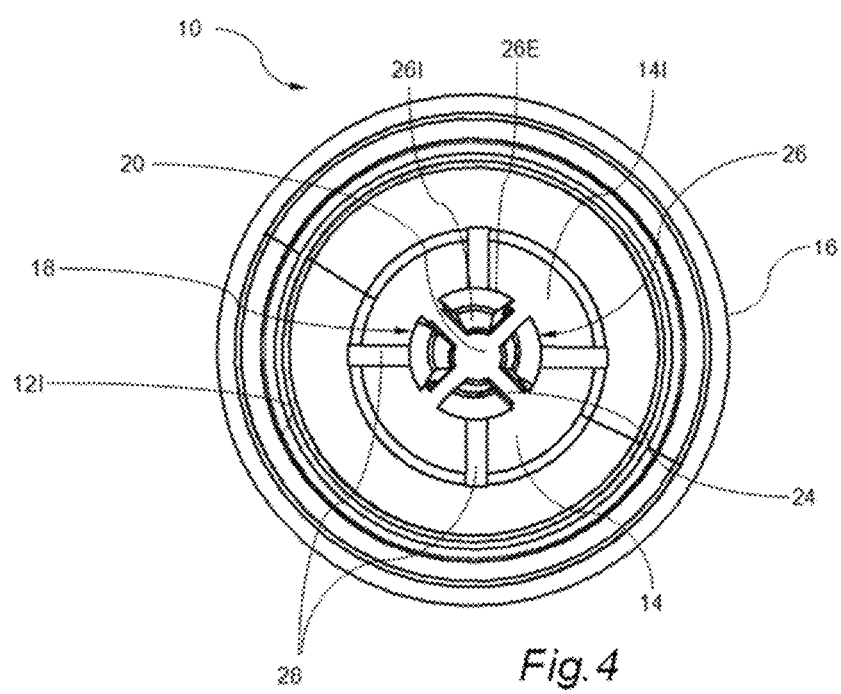
FIG. 4 is a top view of the plug of FIG. 2.

Thus, in the first preferred embodiment illustrated in FIGS. 2 to 4, the plug 10 comprises four radial ribs 28 evenly spaced and radiating from the rod member 18 in a symmetrical manner. Preferably, each rib 28 extends radially in projection on the inner surface 14*l* of the end wall 14 from the rod member 18 up to the inner surface 12*l* of the cylindrical wall 12 of the plug 10.

In this first embodiment, the plug 10 is formed by one single part for example through an injection molding process. For example, the plug 10 is made of a plastic material such as polyamide.

Preferably, in this first embodiment, the retaining element 22 is provided with at least two axial slots 24 extending from the free end 18A of the rod member 18. These two axial slots 24 delimit at least two axial lobes 26 adapted to elastically get close to each other inwardly during the fitting of the hose 200. These axial lobes 26 preferably form flexible projections with a teeth-like shape or with a general shape of a cylinder section preferably extending from the inner surface 14*l* of the end wall 14. Furthermore, in this example, at the base of the rod member 18 and therefore at the base of each axial lobe 26, the radial thickness increases slightly so that the foot of each axial lobe 26 is thickened.

In the example illustrated in FIGS. 2 to 4, the retaining element 22 is provided with four axial slots 24 in order to delimit four axial lobes 26. Preferably, the arrangement of the lobes 26 is symmetrical by mirroring.

Preferably, as represented in FIG. 2, each axial lobe 26 has an inner surface 26*l*, turned towards the venting channel 20 with a general shape consisting of an inner surface of a longitudinal wall section of a hollow cylinder. Thus, the different inner surfaces 26*l* of the axial lobes 26 delimit together the internal wall of the venting channel 26.

Each axial slot 24 is formed from the free end 18A of the rod member 18 at least up to two thirds of the depth of the cylindrical section 32 thereby allowing conferring elasticity to the lobes 26 of the fitting 30 adapted to get close to each other, in particular during the fitting of the hose 200 around the rod member 18. Moreover, these axial slots 24 have the advantage of providing a sufficient elastic bending to the rod member 18 to facilitate the fitting of the hose 200 but also of providing a bending of the lobes 26 facilitating the unmolding of the plug 10 when the latter is manufactured through a molding operation and consequently requires an unmolding operation.

Preferably, the axial lobes 26 are shaped so as to get close to each other inwardly of the rod member 18 in order to compose together at the end a substantially closed circular contour. This closed circular contour delimits an inlet orifice of the venting channel 20. Thus, in the described example, each axial lobe 26 has a circle section at the end thereof which when getting close to each other reconstitute a substantially closed circle as clearly shown in FIG. 4.

Preferably and as shown in FIG. 2, the axial slots 24 extend from the free end 18A of the rod member 18 substantially up to the inner surface 14*l* of the end wall 14 of the plug 10. This allows providing, in addition to an elasticity of the rod member 18 at its free end for forming an elastic retaining element 22, passages 40 for air circulation at the base of the rod member 18 as will be explained in more detail hereinbelow.

In this first embodiment, the axial slots 24 extend beyond the limit of the stroke of the hose 200 to delimit the passages 40 for air circulation from the venting central channel 20 between an end of the hose 200 and the end wall 14.

Preferably, the plug 10 comprises as many ribs 24 as axial lobes 26 and each rib 26 links an axial lobe 26 to the cylindrical wall 12 of the plug 10.

In FIG. 7, there is represented a plug 10 according to the second embodiment of the invention. In this second embodiment, elements similar to those of the first embodiment bear identical reference numerals.

In this second embodiment, unlike the first embodiment, the rod member 18 is devoid of any axial slot extending from the end 18A.

The rod member 18 is preferably provided at its base 50 with at least one venting orifice 52. In the illustrated example, the rod member 18 has a venting channel 20 provided with a plurality of venting orifices 52 opening at its base 50 forming the passages 40 for air flow circulating in the venting channel 20. Furthermore, in the example illustrated in FIG. 7, the rod member 18 has at its base 50 a protrusion 54 serving as a fitting end-of-stroke stop of the hose 200.

In order to simplify the manufacture of the plug 10 according to the second embodiment, the plug 10 is made into two portions, a first part forming the external body 11 of the plug 10, that is to say the external cylindrical wall 12 as well as the end wall 14 and a second part forming the rod member 18.

Preferably, the two parts 11 and 18 are forcibly assembled. For example, the external body 11 is provided with an opening 56 for receiving the rod member 18 by forced snap-fitting. For example, the receiving opening 56 and the base 50 of the rod member 18 comprise complementary snap-fitting means adapted to cooperate in a conventional manner so as to enable a coupling of the two parts with each other by forced snap-fitting.

In the illustrated example, the base 50 of the rod member 18 has a staggered external profile in order to delimit on the one hand at the lower portion of the base 50 a snap-fitting profile matching with an inner profile of the receiving opening 56 and on the other hand at the upper portion of the base 50 the stop protrusion 56 projecting inside the plug 10. By "snap-fitting", is meant in particular any means involving the overrunning of a bulge 60 by elastic deformation of a lug 58, and then the elastic return into the non-stressed position of said lug 58 after overrunning the bulge 60 as illustrated in FIG. 7.

Of course, alternatively, it is possible to consider any means for forced assembly or other operations for assembling together two parts without departing from the scope of the invention.

The main aspects of operation of the venting plug according to the first embodiment of the invention will now be described, in particular with reference to FIGS. 5 and 6.

First of all, the end 18A of the rod member 18 forming the retaining element 22 is inserted inside the circular opening of the hose 200. When the trunconical fitting 30 is forcibly pushed into the circular opening of the hose 200, the latter is retained at the rod member 18. In the first embodiment, during this fitting step, the lobes 26 of the rod member 18 are adapted to get close to each other, thanks to the elasticity conferred by the presence of the axial slots 24 facilitating the fitting operation, and then to exert a retaining force by elastic bias.

Furthermore, during the fitting of the hose 200, the stroke of the latter is stopped by the stop ribs 28 without reaching the inner surface 14*l* of the end wall 14 of the plug 10. Hence, there is still at least one air flow passage 40 formed by the end of the axial slots 24 and delimited on the one hand by the lateral faces of axial lobes 26 and on the other hand by the end 200A of the hose 200 and the inner surface 14*l* of the end wall 14.

Figure 5:
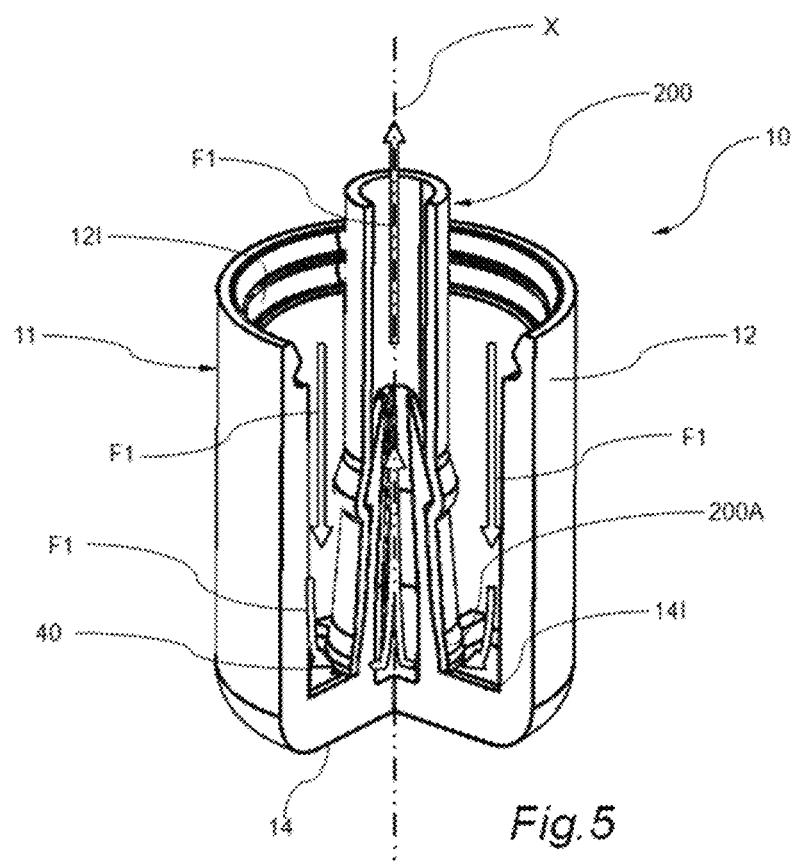
FIG. 5 is a cutaway view of the plug of FIG. 2 after fitting of a hose for connecting the plug to the transmission casing illustrating an air intake phase.

As shown in FIG. 5, when the internal pressure inside the gearbox 100 is lower than the atmospheric pressure, external air is admitted inside the plug 10 according to the circulation direction of the arrows F1 firstly throughout the space between the cylindrical wall 12 and the external surface of the hose 200, and then via the flow passages 40 at the base of the rod member 18 before finally flowing inside the venting channel 20.

Figure 6:
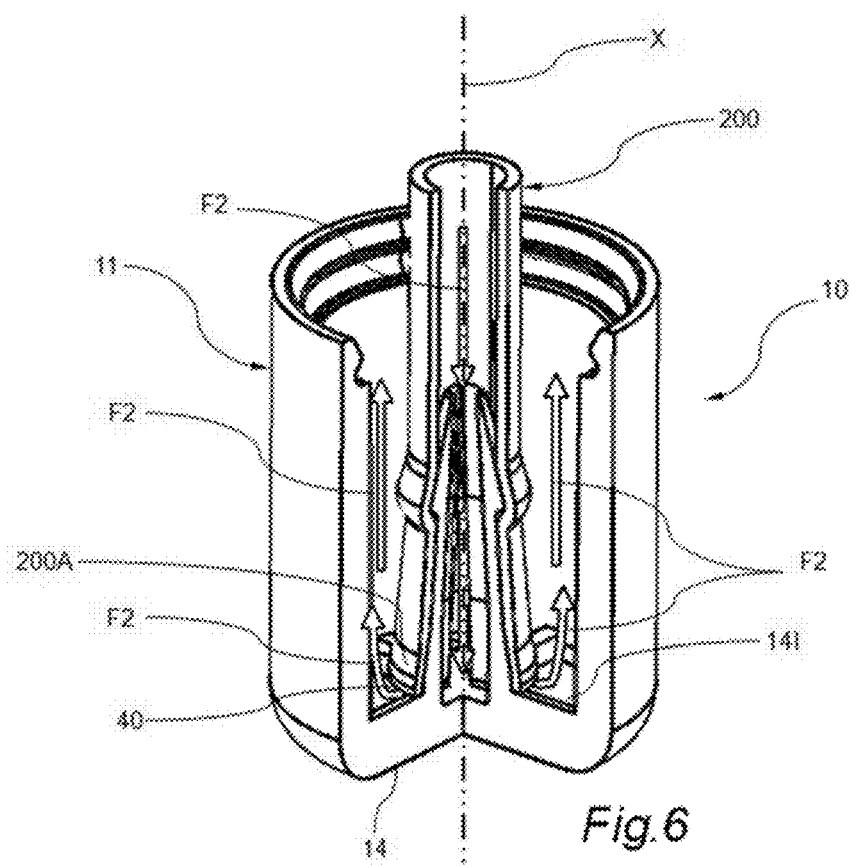
FIG. 6 is a cutaway view of the plug of FIG. 2 after fitting of a hose for connecting the plug to the transmission casing illustrating an air discharge phase.

Conversely, in FIG. 6, when the internal pressure is higher than the atmospheric pressure, air inside the gearbox 100 is expelled towards the outside of the plug 10 according to the circulation direction of the arrows F2 in the direction opposite to the arrows F1 of FIG. 5.

As regards the second embodiment of the plug according to the invention illustrated in FIG. 7, a first step of assembling the rod member 18 and the external body 11 is carried out. Thus, the rod member 18 is introduced by the outside of the end wall 14 and engaged throughout the receiving opening 56 until the snap-fitting lug 58 formed by the outer profile of the base 50 overruns the bulge 60 formed by the inner profile of the receiving opening 56. The next steps are then substantially similar to those already described hereinabove.

Of course, the invention is not limited to the previously-described embodiments. Other embodiments within the reach of those skilled in the art may also be considered yet without departing from the scope of the invention defined by the claims hereinafter.

The invention claimed is:

1. A venting plug adapted to be mounted around an end of a hose intended to be connected at the other end to an opening provided in a case of an automotive component, the venting plug comprising:
   an external body with a peripheral sidewall around a main axis closed by an end wall,
   a central rod member projecting axially from an inner surface of the end wall and being provided with a venting internal channel opening transversely at least at the base of the rod member in a mounted position of the hose, wherein:
   a free end of the rod member is provided with a retaining element around which the hose is fitted,
   the retaining element is configured to retain the fitted hose tightened around the rod member, and
   the fitting stroke of the hose along the rod member is limited by at least one rib protruding from the inner surface of the end wall forming an end-of-stroke stop, the rib extending longitudinally radially from the rod member up to the internal cylindrical wall.

2. The plug according to claim 1, wherein the retaining element comprises a trunconical fitting flaring from the free end of the rod member and extending in a cylindrical section that forms a shoulder beneath the fitting.

3. The plug according to claim 1, wherein the venting plug is made integrally in one-piece via molding.

4. The plug according to claim 1, further comprising:
   at least two parts that are assembled together, including a first part comprising the external body and a second part comprising the rod member.

5. The plug according to claim 4, wherein the end wall of the external body is provided with an opening for receiving the rod member to couple by forced snap-fitting the external body and the rod member.

6. The plug according to claim 1, wherein a base of the rod member has at least one venting orifice and an end-of-stroke stop protrusion of the hose.

7. The plug according to claim 1, wherein the rod member fully extends inside the internal volume delimited by the end wall and the peripheral wall of the plug.

8. The plug according to claim 1, wherein the retaining element is provided with at least two axial slots extending from the free end of the rod member in order to delimit at least two axial lobes adapted to elastically move closer to each other inwardly during the fitting of the hose.

9. The plug according to claim 8, wherein the rod member is provided with a plurality of axial slots in order to delimit the same number of axial lobes.

10. The plug according to claim 8, wherein the axial slots extend from the free end of the rod member up to the inner surface of the end wall of the plug and extend beyond the limit of the stroke of the hose to form passages for air flow from the venting central channel between an end of the hose and the end wall.

11. The plug according to claim 8 wherein the axial lobes are separated from each other and are formed from the inner surface of the end wall.

12. The plug according to claim 8, wherein the axial lobes are evenly distributed around the axis and delimit together the venting channel.

13. The plug according to claim 8, wherein each lobe has an inner surface with a general shape consisting of an inner surface of a wall section of a hollow cylinder.

14. The plug according to claim 8, wherein the axial lobes are shaped so as to move closer to each other inwardly of the rod member in order to form a substantially closed circular contour at an end of the rode member that delimits an inlet of the venting channel.

* * * * *